(12) United States Patent
Koshiba

(10) Patent No.: US 9,344,646 B2
(45) Date of Patent: May 17, 2016

(54) IMAGING DEVICE AND IMAGING METHOD

(71) Applicant: FUJIFILM Corporation, Tokyo (JP)

(72) Inventor: Masaaki Koshiba, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/562,009

(22) Filed: Dec. 5, 2014

(65) Prior Publication Data

US 2015/0092093 A1  Apr. 2, 2015

Related U.S. Application Data

(63) Continuation of application No. PCT/JP2013/062254, filed on Apr. 25, 2013.

(30) Foreign Application Priority Data

Jun. 7, 2012 (JP) ................................ 2012-129815

(51) Int. Cl.
*H04N 5/232* (2006.01)
*G03B 13/00* (2006.01)
(Continued)

(52) U.S. Cl.
CPC .................. *H04N 5/341* (2013.01); *G02B 7/34* (2013.01); *H04N 5/23212* (2013.01); *H04N 5/3696* (2013.01); *H04N 5/374* (2013.01); *H04N 9/045* (2013.01)

(58) Field of Classification Search
CPC ..... H04N 5/341; H04N 5/374; H04N 5/3696; H04N 5/23212; H04N 9/045; G02B 7/34
USPC ......................................... 348/349, 350, 362
See application file for complete search history.

(56) References Cited

U.S. PATENT DOCUMENTS 6,829,008 B1* 12/2004 Kondo .................... G02B 7/34
348/302
2010/0091161 A1* 4/2010 Suzuki .............. H01L 27/14609
348/302

(Continued)

FOREIGN PATENT DOCUMENTS

JP   2009-128579 A   6/2009
JP   2010-054968 A   3/2010

(Continued)

OTHER PUBLICATIONS

International Search Report issued in PCT/JP2013/062254 dated Jun. 11, 2013.

(Continued)

*Primary Examiner* — Sinh Tran
*Assistant Examiner* — Zhenzhen Wu
(74) *Attorney, Agent, or Firm* — Birch, Stewart, Kolasch & Birch, LLP

(57) ABSTRACT

A unit group which is formed by pixel cell rows L1, L2, L1A, and L2A is divided into groups BG1 and BG2. The defocus amount calculating unit calculates a phase difference of the output signal group of the phase difference detecting pixel cells 51R with respect to the output signal group of the phase difference detecting pixel cells 51L for BG1, calculates a phase difference of the output signal group of the phase difference detecting pixel cells 51L with respect to the output signal group of the phase difference detecting pixel cells 51R for BG2, and calculates a defocus amount based on a difference between the two calculated phase differences. The driving unit performs exposure in the order of the pixel cell rows L1 and L2 for BG1 and performs exposure in the order of the pixel cell rows L2A and L1A for BG2.

7 Claims, 9 Drawing Sheets

(51) Int. Cl.
    *H04N 5/341*     (2011.01)
    *G02B 7/34*     (2006.01)
    *H04N 5/369*     (2011.01)
    *H04N 9/04*     (2006.01)
    *H04N 5/374*     (2011.01)

(56) References Cited

U.S. PATENT DOCUMENTS

2010/0302433 A1* 12/2010 Egawa ............... G02B 7/34
    348/345

2015/0124153 A1* 5/2015 Hamada ............. H04N 5/23212
    348/349
2015/0181102 A1* 6/2015 Oda ....................... H04N 5/243
    348/229.1

FOREIGN PATENT DOCUMENTS

JP      2010-288083 A     12/2010
JP      2012-238951 A     12/2012

OTHER PUBLICATIONS

Written Opinion of the International Searching Authority issued in PCT/JP2013/062254 dated Jun. 11, 2013.

* cited by examiner

IMAGING DEVICE AND IMAGING METHOD

CROSS REFERENCE TO RELATED APPLICATION

This is a continuation of International Application No. PCT/JP2013/062254 filed on Apr. 25, 2013, and claims priority from Japanese Patent Application No. 2012-129815, filed on Jun. 7, 2012, the entire disclosures of which are incorporated herein by reference.

BACKGROUND

1. Technical Field

The present invention relates to an imaging device and an imaging method.

2. Related Art

Recently, as the resolution of a solid-state imaging element such as a charge coupled device (CCD) image sensor and a complementary metal oxide semiconductor (CMOS) image sensor becomes higher, a demand for an information device including an imaging function such as a digital still camera, a digital video camera, a cellular phone such as a smart phone, and a personal digital assistant (PDA) is rapidly increasing. Further, the information device having an imaging function as described above is referred to as an imaging device.

In such an imaging device, as a focus control method which focuses on a main subject, a contrast auto focus (AF) method or a phase difference AF method is employed. Since the phase difference AF method may detect a focusing position with high precision at a high speed as compared with the contrast AF method, the phase difference AF method is widely employed in various imaging devices.

For example, Patent Literature 1 (JP-A-2010-288083) discloses an imaging device which has some of the pixel cells included in a CMOS image sensor as pupil dividing pixel cells and performs the phase difference AF using signals read out from the pupil dividing pixel cells.

SUMMARY OF INVENTION

Generally, the CMOS image sensor is driven by a rolling shutter method which sequentially reads out signals corresponding to each exposure period while shifting exposure periods for respective lines of pixel cells. Therefore, a signal group is obtained by an arbitrary line including pupil dividing pixel cells and a signal group is obtained by a following line of the arbitrary line which includes pupil dividing pixel cells so that a correlation calculation of the output signals of the pupil dividing pixel cells included in the signal groups is performed to calculate a defocus amount. An error caused by a difference of the exposure periods of the two signal groups may be included in the defocus amount. As a result, the phase difference AF may not be precisely performed.

The imaging device disclosed in Patent Literature 1 starts to simultaneously expose all pixel cells in the frame on which the phase difference AF is performed so as not to cause a difference of the exposure periods between two signal groups on which the correlation calculation is performed. According to this imaging device, the phase difference AF may be precisely performed.

However, in the imaging device disclosed in Patent Literature 1, a frame where exposures on all the pixel cells are simultaneously initiated and a frame where exposures on respective lines of the pixel cells are differently initiated are mixed in moving image frames, so that continuity of a moving image to be photographed disappears so that a user may feel a sense of strangeness.

In view of above, an illustrative aspect of the present invention is to provide an imaging device and an imaging method which calculate a defocus amount having no error caused by rolling shutter driving without significantly affecting a photographed image.

An aspect of the present invention provides an imaging device, including: an imaging element which includes a plurality of first pixel cell rows which includes a plurality of first pixel cells which receives one of a pair of luminous fluxes passing through different regions of a pupil area of a photographing optical system to output signals in accordance with an amount of received light and is arranged with a predetermined interval in a row direction and a plurality of second pixel cell rows which includes a plurality of second pixel cells which receives the other one of the pair of luminous fluxes to output signals in accordance with an amount of received light and is arranged with the predetermined interval in the row direction, the first pixel cell rows and the second pixel cell rows being alternately arranged in a column direction which is perpendicular to the row direction, a driving unit drives to shift exposure periods of the pixel cell rows, respectively and read out signals output from the first pixel cells or the second pixel cells which are included in each pixel cell row in accordance with the amount of received light during the exposure periods; a defocus amount calculating unit which calculates a defocus amount using the output signals of the first pixel cells and the output signals of the second pixel cells; and a focus control unit which controls a focus state of the photographing optical system based on the defocus amount calculated by the defocus amount calculating unit, in which the pixel cell rows which are arranged in the column direction are divided into groups having the same number of first pixel cell rows and second pixel cell rows as groups each of which includes n (n is an even number) pixel cell rows which are continuously arranged in the column direction, and the driving unit drives to initiate the exposure of two adjacent pixel cell rows in one of two groups which are continuously arranged in the column direction in a reverse order to an order of initiation of the exposure of two pixel cell rows which are disposed at corresponding positions in the other one of the two groups.

Another aspect of the present invention provides an imaging method, which is performed on an imaging element which includes a plurality of first pixel cell rows which includes a plurality of first pixel cells which receives one of a pair of luminous fluxes passing through different regions of a pupil area of a photographing optical system to output signals in accordance with an amount of received light and is arranged with a predetermined interval in a row direction and a plurality of second pixel cell rows which includes a plurality of second pixel cells which receives the other one of the pair of luminous fluxes to output signals in accordance with an amount of received light and is arranged with the predetermined interval in the row direction, the first pixel cell rows and the second pixel cell rows being alternately arranged in a column direction which is perpendicular to the row direction, the method including: a driving step of driving to shift exposure periods of the pixel cell rows, respectively and read out signals output from the first pixel cells or the second pixel cells which are included in each pixel cell row in accordance with the amount of received light during the exposure periods; a defocus amount calculating step of calculating a defocus amount using the output signals of the first pixel cells and the output signals of the second pixel cells; and a focus control step of controlling a focus state of the photographing optical system based on the calculated defocus amount, in which the pixel cell rows which are arranged in the column direction are divided into groups having the same number of first pixel cell rows and second pixel cell rows as groups each of which includes even numbers of pixel cell rows which are continuously arranged in the column direction, and the driving step drives to initiate the exposure of two adjacent pixel cell rows in one of two groups which are continuously arranged in the column direction in a reverse order to an order of initiation of the exposure of two pixel cell rows which are disposed at corresponding positions in the other one of the two groups.

According to the present invention, it is possible to provide an imaging device and an imaging method which may calculate a defocus amount having no error caused by rolling shutter driving without significantly affecting a photographed image.

DESCRIPTION OF EMBODIMENTS

Hereinafter, an exemplary embodiment of the present invention will be described with reference to the drawings.

Figure 1:
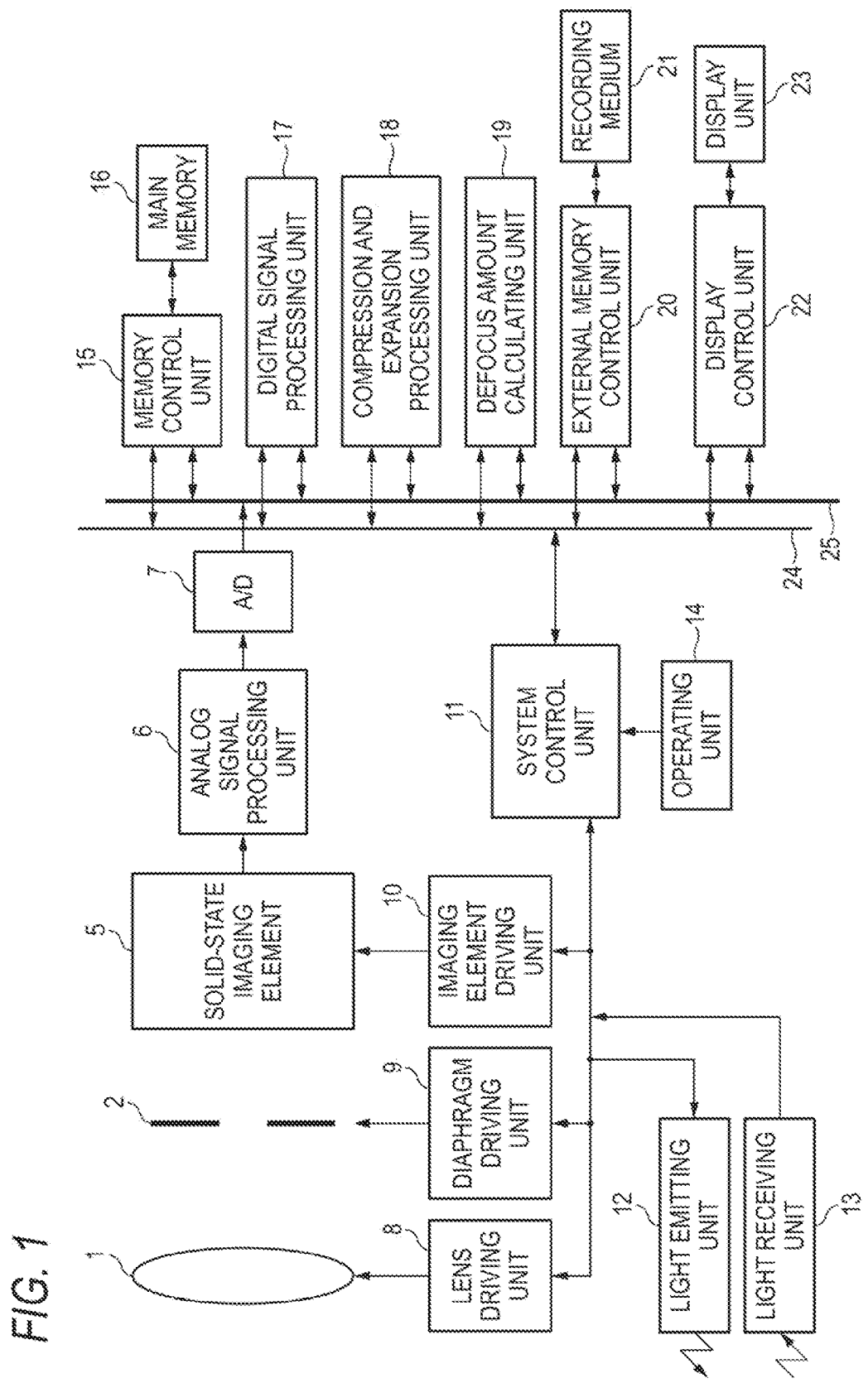
FIG. 1 is a diagram illustrating a schematic configuration of a digital camera as an example of an imaging device for explaining an exemplary embodiment of the present invention.

FIG. 1 is a diagram illustrating a schematic configuration of a digital camera as an example of an imaging device for explaining an exemplary embodiment of the present invention.

An imaging system of a digital camera illustrated in FIG. 1 includes a photographing lens 1 as a photographing optical system, a MOS-type solid-state imaging element 5, such as a CMOS image sensor, and a diaphragm 2 provided therebetween.

A system control unit 11 which collectively controls an entire electrical control system of the digital camera controls a flash light emitting unit 12 and a light receiving unit 13. Further, the system control unit 11 controls a lens driving unit 8 to adjust a position of a focus lens included in the photographing lens 1 or adjust a position of the zoom lens included in the photographing lens 1. Further, the system control unit 11 controls an aperture size of the diaphragm 2 through a diaphragm driving unit 9 so as to adjust an exposure amount.

The system control unit 11 drives the solid-state imaging element 5 through an imaging element driving unit 10 and outputs a subject image captured through the photographing lens 1 as a captured image signal. An instruction signal from a user is input to the system control unit 11 through an operating unit 14.

The electrical control system of the digital camera further includes an analog signal processing unit 6 connected to an output of the solid-state imaging element 5 to perform an analog signal processing such as a correlated double sampling processing and an A/D converting circuit 7 which converts an analog signal output from the analog signal processing unit 6 into a digital signal. The analog signal processing unit 6 and the A/D converting circuit 7 are controlled by the system control unit 11. The analog signal processing unit 6 and the A/D converting circuit 7 may be embedded in the solid-state imaging element 5.

The electrical control system of the digital camera includes a main memory 16, a memory control unit 15 connected to the main memory 16, a digital signal processing unit 17 which performs an interpolation operation, a gamma correction operation, and an RGB/YC conversion processing on a captured imaging signal output from the A/D converting circuit 7 to generate photographed image data, a compression and expansion processing unit 18 which compresses the photographed image data generated in the digital signal processing unit 17 in a JPEG format or expands the compressed image data, a defocus amount calculating unit 19 which calculates a defocus amount, an external memory control unit 20 to which a detachable recording medium 21 is connected, and a display control unit 22 to which a display unit 23 mounted on a rear surface of a camera is connected. The memory control unit 15, the digital signal processing unit 17, the compression and expansion processing unit 18, the defocus amount calculating unit 19, the external memory control unit 20, and the display control unit 22 are connected to each other by a control bus 24 and a data bus 25 and controlled by a command from the system control unit 11.

Figure 2:
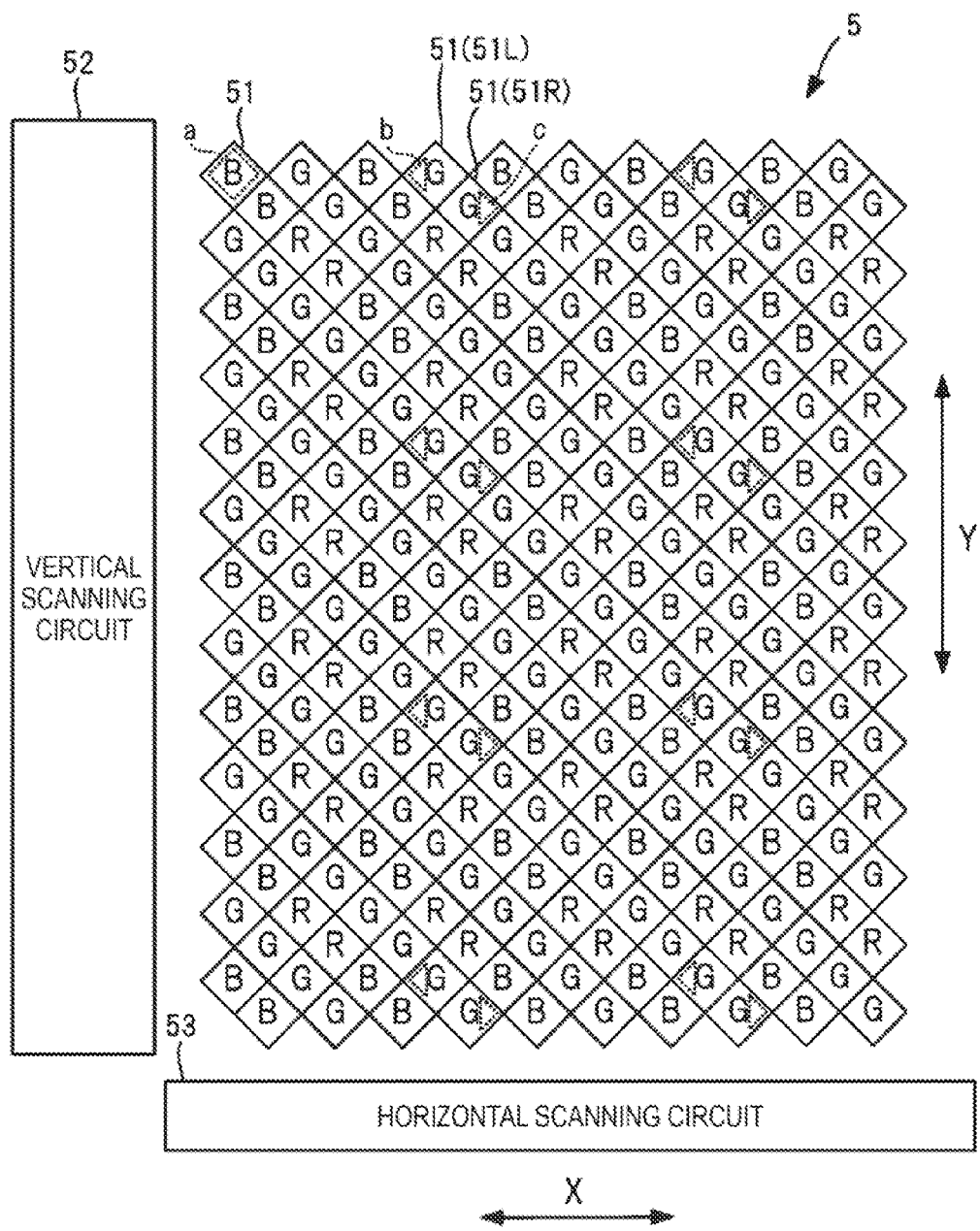
FIG. 2 is a schematic plan view illustrating a configuration of a solid-state imaging element 5 which is mounted in the digital camera illustrated in FIG. 1.

FIG. 2 is a schematic plan view illustrating a configuration of the solid-state imaging element 5 which is mounted in the digital camera illustrated in FIG. 1.

The solid-state imaging element 5 includes a plurality of pixel cells 51 (respective square blocks in the drawing) which is two-dimensionally arranged in a row direction X and a column direction Y perpendicular to the row direction X.

Each pixel cell 51 includes a photoelectric converting unit such as a photodiode, a color filter which is formed above the photoelectric converting unit, and a signal output circuit which outputs a signal in accordance with signal charges which are accumulated in the photoelectric converting unit.

The signal output circuit is a well-known MOS circuit and, for example, is configured to include a charge accumulating unit to which charges accumulated in the photoelectric converting unit are transmitted, a transmission transistor which transmits the charges of the photoelectric converting unit to the charge accumulating unit, a reset transistor which resets a potential of the charge accumulating unit, an output transistor which outputs a signal in accordance with the potential of the charge accumulating unit, and a row selecting transistor which selectively outputs a signal from the output transistor to an output signal line.

In FIG. 2, a pixel cell 51 including a color filter which transmits a red light component is denoted by a reference character R, a pixel cell 51 including a color filter which transmits a green light component is denoted by a reference character G, and a pixel cell 50 including a color filter which transmits a blue light component is denoted by a reference character B.

The plurality of pixel cells 51 is arranged such that a plurality of pixel cell rows including a plurality of pixel cells 51 which is arranged in the row direction X is arranged in the column direction Y. An odd-numbered pixel cell row and an even-numbered pixel cell row are off-centered by approximately a half an arrangement pitch of the pixel cells 51 of each pixel cell row in the row direction X.

The arrangement of the color filters which are included in the respective pixel cells 51 of an odd-numbered pixel cell row is a Bayer arrangement as a whole. Further, the arrangement of the color filters which are included in the respective pixel cells 51 of an even-numbered pixel cell row is a Bayer arrangement as a whole. One pixel cell 51 in an odd-numbered row and the other pixel cell 51 adjacent thereto at a right lower side, which detect the same color light, form a paired pixels.

According to the solid-state imaging element 5 having such a pixel cell arrangement, output signals of two pixel cells 51 which form the paired pixels may be added up to achieve a high sensitivity camera or exposure times of the two pixel cells 51 which configure the paired pixels may be changed and output signals of the two pixel cells 51 may be added up to achieve a wide dynamic range of a camera.

In the solid-state imaging element 5, some of the plurality of pixel cells 51 is phase difference detecting pixel cells. The phase difference detecting pixel cells include a phase difference detecting pixel cell (denoted by a reference character 51R) which receives one (for example, a luminous flux passing through a right half of a pupil area) of a pair of luminous fluxes which passes through different portions of the pupil area of the photographing lens 1 to output a signal in accordance with a received light amount and a phase difference detecting pixel cell (denoted by a reference character 51L) which receives the other (for example, a luminous flux passing through a left half of the pupil area) of the pair of luminous fluxes to output a signal in accordance with a received light amount.

A light shielding film is provided above the photoelectric converting unit of the pixel cell 51 and an opening which defines a light receiving area of the photoelectric converting unit is formed in the light shielding film. A center of an opening (denoted by reference character "a" in FIG. 2) of a general pixel cell 51, other than the phase difference detecting pixel cell 51R and the phase difference detecting pixel cell 51L, coincides with a center (a center of a square block) of the photoelectric converting unit of the general pixel cell 51. Further, in FIG. 2, in order to simplify the drawing, the opening "a" is illustrated only in a part of the general pixel cells 51.

To the contrary, a center of an opening (denoted by reference character "c" in FIG. 2) of the phase difference detecting pixel cell 51R is off-centered to the right with respect to the center of the photoelectric converting unit of the phase difference detecting pixel cell 51R.

A center of an opening (denoted by reference character "b" in FIG. 2) of the phase difference detecting pixel cell 51 L is off-centered to the left with respect to the center of the photoelectric converting unit of the phase difference detecting pixel cell 51L.

In the solid-state imaging element 5, a part of the pixel cells 51 mounted with green color filters serve as the phase difference detecting pixel cells 51 R and the phase difference detecting pixel cells 51L. Of course, pixel cells mounted with color filters of other colors may serve as phase difference detecting pixel cells.

In a part (in an example of FIG. 2, four pixel cell rows which are arranged with an interval of three pixel cell rows) of even-numbered pixel cell rows, the phase difference detecting pixel cells 51R are disposed in a row direction X with a predetermined interval (an interval of three pixel cells in the example of FIG. 2).

In a part (pixel cell rows adjacent to the pixel cell rows including the phase difference detecting pixel cells 51R) of odd-numbered pixel cell rows, the phase difference detecting pixel cells 51L are disposed in the row direction X with the same interval as that of the phase difference detecting pixel cells 51R.

With this configuration, light from the left side of the photographing lens 1, that is, light coming in a direction where a subject is seen through a left eye mainly becomes light which passes through the opening "b" of the light shielding film to be received by the pixel cell 51L and light from the right side of the photographing lens 1, that is, light coming in a direction where a subject is seen through a right eye mainly becomes light which passes through the opening "c" of the light shielding film to be received by the pixel cell 51R.

That is, a captured image signal which is obtained by seeing the subject through the right eye may be obtained by all phase difference detecting pixel cells 51R and a captured image signal which is obtained by seeing the subject through the left eye may be obtained by all phase difference detecting pixel cells 51L. Therefore, stereoscopic image data of the subject may be generated by combining both image signals or phase difference information may be generated by performing correlation calculation on both image signals.

The phase difference detecting pixel cell 51R and the phase difference detecting pixel cell 51L have reversely off-centered openings of the light shielding films so that the photographing lens 1 may receive luminous fluxes which pass through different pupil areas so as to obtain the phase difference information. However, the structure to obtain the phase difference information is not limited thereto, and a well-known structure may be employed.

The solid-state imaging element 5 further includes a vertical scanning circuit 52 and a horizontal scanning circuit 53.

The vertical scanning circuit 52 performs an on/off control of a transmission transistor, a reset transistor, and a row selecting transistor of a signal output circuit which is included in each pixel cell 51.

The horizontal scanning circuit 53 is connected to an output signal line which is provided for every pixel cell column which is formed by pixel cells 51 which are arranged in a column direction Y, and sequentially outputs output signals, which are output from respective pixel cells 51 in the pixel cell row to the output signal line, to the outside of the solid-state imaging element 5.

The vertical scanning circuit 52 and the horizontal scanning circuit 53 operate in accordance with an instruction of the imaging element driving unit 10 illustrated in FIG. 1. The imaging element driving unit 10 shifts exposure periods for respective pixel cell rows by a predetermined time to drive the solid-state imaging element 5 by a so-called rolling shutter method.

The exposure period of each pixel cell 51 of the pixel cell row starts at a point of time when the reset transistor of the pixel cell 51 is turned on and a potential of the charge accumulating unit included in the pixel cell 51 is reset, and ends at a point of time when the transmission transistor included in the pixel cell 51 is turned on and the charges accumulated in the photoelectric converting unit of the pixel cell 51 are completely transmitted to the charge accumulating unit. The imaging element driving unit 10 controls the vertical scanning circuit 52 so that start timings of the exposure periods are different for the respective pixel cell rows.

The defocus amount calculating unit 19 illustrated in FIG. 1, calculates a focus adjustment state of the photographing lens 1 which is an amount deviated from the focused state and a direction thereof in this case, that is, a defocus amount using an output signal group read out from the phase difference detecting pixel cells 51L, and the phase difference detecting pixel cells 51R.

The system control unit 11 illustrated in FIG. 1 controls a focus lens included in the photographing lens 1 at a focus position based on the defocus amount calculated by the defocus amount calculating unit 19 to function as a focus control unit which controls the focused state of the photographing lens 1.

When a pixel cell row including the phase difference detecting pixel cells 51R is a first pixel cell row and a pixel cell row including the phase difference detecting pixel cells 51L is a second pixel cell row, a group formed by two first pixel cell rows and two second pixel cell rows which are alternately arranged to each other in the column direction Y is considered as a unit group. Then, the defocus amount calculating unit 19 calculates the defocus amount for every unit group. Further, a final defocus amount is calculated using defocus amounts which are calculated for all unit groups. For example, an average of the defocus amounts calculated for all unit groups is considered as the final defocus amount.

Figure 3:
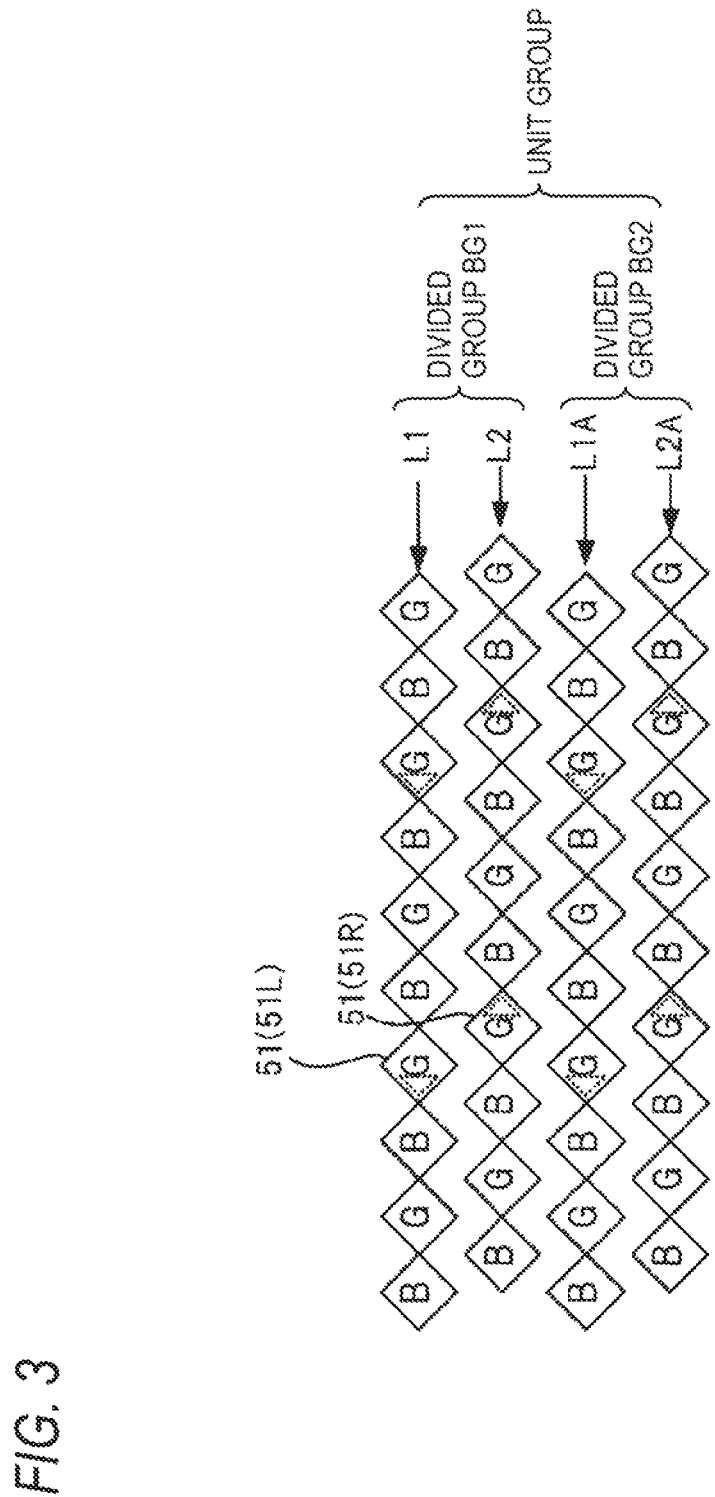
FIG. 3 is a view illustrating four pixel cell rows which include phase difference detecting pixel cells which belong to a unit group.

FIG. 3 is a view illustrating four pixel cell rows which include phase difference detecting pixel cells which belong to a unit group. A pixel cell row L1 illustrated in FIG. 3 is a first pixel cell row from the top in FIG. 2, a pixel cell row L2 illustrated in FIG. 3 is a second pixel cell row from the top in FIG. 2, a pixel cell row L1A illustrated in FIG. 3 is a ninth pixel cell row from the top in FIG. 2, and a pixel cell row L2A illustrated in FIG. 3 is a tenth pixel cell row from the top in FIG. 2.

Hereinafter, a group formed by the pixel cell row L1 and the pixel cell row L2 is referred to as a divided group BG1 and a group formed by the pixel cell row L1A and the pixel cell row L2A is referred to as a divided group BG2.

The defocus amount calculating unit 19 calculates a phase difference θa of the output signal group of the phase difference detecting pixel cells 51R included in the divided group BG1 with respect to the output signal group of the phase difference detecting pixel cells 51L included in the divided group BG1 by performing the correlation calculation on the two output signal groups.

The defocus amount calculating unit 19 calculates a phase difference θb of the output signal group of the phase difference detecting pixel cells 51L included in the divided group BG2 with respect to the output signal group of the phase difference detecting pixel cells 51R included in the divided group BG2 by performing the correlation calculation on the two output signal groups.

The phase difference θa includes a phase difference component α1 of the output signal group of the phase difference detecting pixel cells 51R of the pixel cell row L2 with respect to the output signal group of the phase difference detecting pixel cells 51L of the pixel cell row L1 and a phase difference error component β1 caused by a difference of exposure periods of the pixel cell row L1 and the pixel cell row L2.

The phase difference θb includes a phase difference component α2 of the output signal group of the phase difference detecting pixel cells 51L of the pixel cell row L1A with respect to the output signal group of the phase difference detecting pixel cells 51R of the pixel cell row L2A, and a phase difference error component β2 caused by a difference of exposure periods of the pixel cell row L1A and the pixel cell row L2A.

Here, since four pixel cell rows included in the unit group are disposed to be close to each other, absolute values of the phase difference components α1 and α2 without regard to the signs thereof are considered to be the same. In the meantime, since the output signal groups as references for the correlation calculations are reverse, the signs of the phase difference components α1 and α2 are opposite to each other.

In the general rolling shutter method, driving which shifts the exposure periods by a predetermined time is performed in accordance with an arrangement order of the pixel cell rows from the pixel cell row at the top in FIG. 2. Therefore, in the unit group illustrated in FIG. 3, a difference of the exposure periods of the pixel cell row L1 and the pixel cell row L2 and a difference of the exposure periods of the pixel cell row L1A and the pixel cell row L2A become the same. The absolute values of the error components β1 and β2 without regard to the signs thereof become the same, but the signs are opposite to each other.

That is, when the output signals are read out from the pixel cells of the solid-state imaging element 5 by the general rolling shutter method, the calculated phase differences θa and θb are represented as follows.

$$\theta a = \alpha 1 + \beta 1$$

$$\theta b = -\alpha 2 - \beta 2 = -\alpha 1 - \beta 1$$

When θa is added to θb, the error component β1 may be cancelled. However, in this case, since the phase difference component α1 is also cancelled, exact phase difference information may not be obtained. In the meantime, when a difference between θa and θb is calculated, even though the phase difference component remains, the error component may not be cancelled.

Therefore, in the present exemplary embodiment, the solid-state imaging element 5 is driven so as to satisfy θb=−α1+β1 and the defocus amount calculating unit 19 calculates a difference between the phase difference θa and the phase difference θb so as to remove the error component and obtain the phase difference information.

Specifically, the imaging element driving unit 10 drives to start the exposure periods of the pixel cell rows in the unit group illustrated in FIG. 3 in an order of the pixel cell row L1→the pixel cell row L2→the pixel cell row L2A→the pixel cell row L1A. By this driving, θb=−α1+β1 is satisfied.

Therefore, the defocus amount calculating unit 19 performs an operation of θa−θb or θb−θa to cancel the error component and thus only information corresponding to the phase difference component may be obtained. The defocus amount calculating unit 19 calculates the defocus amount in the unit group based on the information.

The solid-state imaging element 5 may be driven so as to satisfy θa=α1−β1 and θb=−α1−β1, so that the difference between the phase difference θa and the phase difference θb is calculated to cancel the error component. That is, the exposure periods of the pixel cell rows in the unit group illustrated in FIG. 3 may be initiated in the order of the pixel cell row L2→the pixel cell row L1→the pixel cell row L1A→the pixel cell row L2A.

As described above, the defocus amount calculating unit 19 calculates a phase difference for one of two divided groups which form the unit group, based on the output signal group of the phase difference detecting pixel cells 51R and calculates a phase difference for the other one based on the output signal group of the phase difference detecting pixel cells 51L to calculate the defocus amount based on the difference between two phase differences.

The imaging element driving unit 10 drives to cause the initiation order of the exposure periods of the two pixel cell rows for one of the divided groups to coincide with an arrangement order of the pixel cell rows in the column direction Y, and control the initiation order of the exposure periods for the other group to be a reverse order to the arrangement order of the pixel cell rows in the column direction Y. Therefore, it is possible to prevent the error component resulting from a difference of the exposure periods from being included in the difference between the two phase differences and to precisely calculate the defocus amount.

When a moving image is captured in order to display a live view image, the digital camera changes the driving of the solid-state imaging element 5 at an imaging frame for calculating the defocus amount and other imaging frames. The imaging frame for calculating the defocus amount is the same as the other imaging frames in that the exposure periods of the pixel cell rows are shifted. Therefore, similarly to the related art, the driving method is not significantly changed while capturing the moving image and degradation of an image quality of the moving image may be prevented.

In the example of FIG. 2, the solid-state imaging element 5 has two unit groups. However, when the solid-state imaging element 5 has one or more unit groups, the phase difference AF is possible in principle.

Next, a modified exemplary embodiment of a method of calculating a defocus amount by the defocus amount calculating unit 19 will be described.

(First Modified Exemplary Embodiment)

In a first modified exemplary embodiment, the defocus amount calculating unit 19 calculates a defocus amount for every unit group, the unit group being formed by four first pixel cell rows and four second pixel cell rows which are alternately arranged to each other in the column direction Y.

Figure 4:
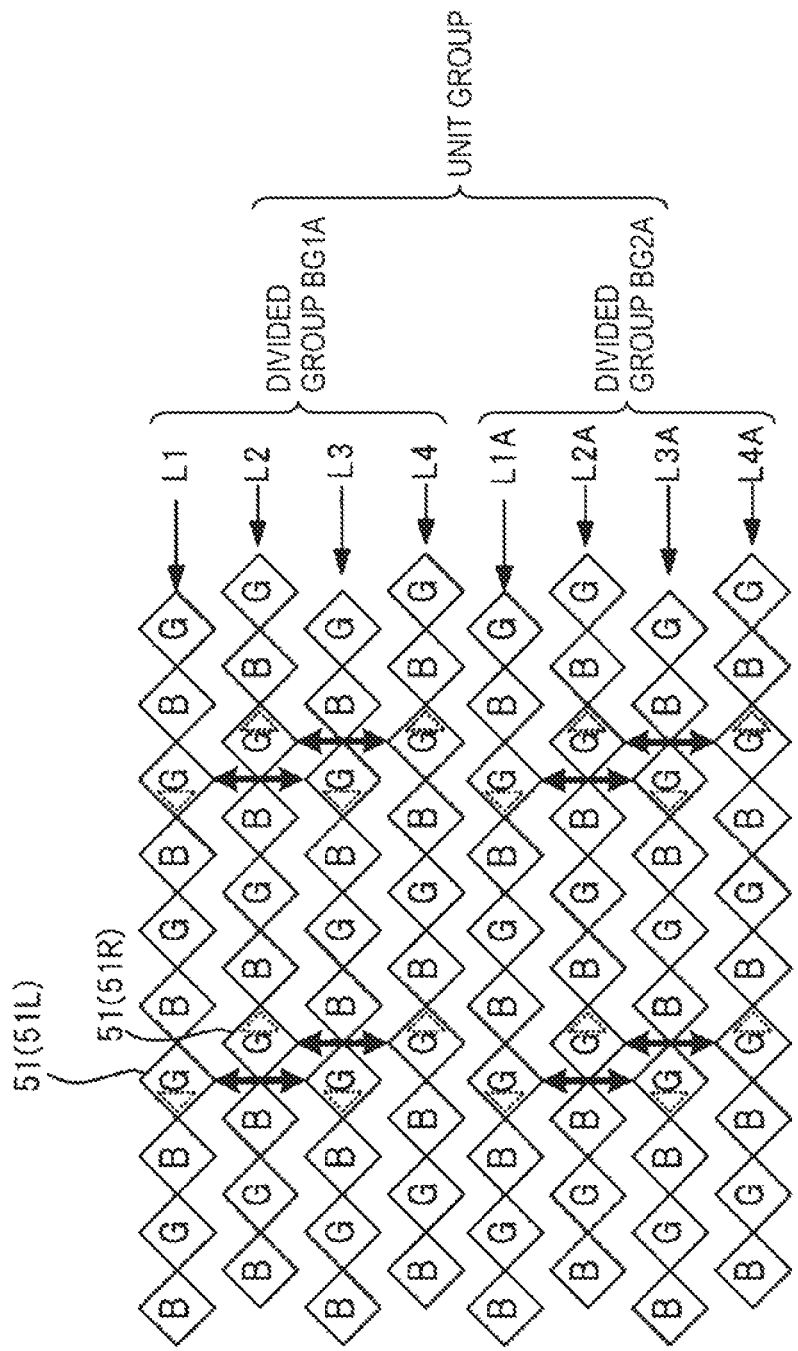
FIG. 4 is a view illustrating eight pixel cell rows which include phase difference detecting pixel cells which belong to a unit group.

FIG. 4 is a view illustrating eight pixel cell rows which include phase difference detecting pixel cells which belong to a unit group. A pixel cell row L1 illustrated in FIG. 4 is a first pixel cell row from the top in FIG. 2, a pixel cell row L2 illustrated in FIG. 4 is a second pixel cell row from the top in FIG. 2, a pixel cell row L3 illustrated in FIG. 4 is a ninth pixel cell row from the top in FIG. 2, and a pixel cell row L4 illustrated in FIG. 4 is a tenth pixel cell row from the top in FIG. 2.

A pixel cell row L1A illustrated in FIG. 4 is a 17th pixel cell row from the top in FIG. 2, a pixel cell row L2A illustrated in FIG. 4 is an 18th pixel cell row from the top in FIG. 2, a pixel cell row L3A illustrated in FIG. 4 is a 25th pixel cell row from the top in FIG. 2, and a pixel cell row L4A illustrated in FIG. 4 is a 26th pixel cell row from the top in FIG. 2.

Hereinafter, a group formed by the pixel cell rows L1 to L4 is referred to as a divided group BG1A and a group formed by the pixel cell rows L1A to L4A is referred to as a divided group BG2A.

The defocus amount calculating unit 19 sets an output signal group obtained by adding up output signals of two phase difference detecting pixel cells 51L among the phase difference detecting pixel cells 51L included in the divided group BG1A, the two phase difference detecting pixel cells 51L being connected by an arrow in FIG. 4 at the same position in the column direction Y, as an output signal group of the phase difference detecting pixel cells 51L in the divided group BG1A.

The defocus amount calculating unit 19 sets an output signal group obtained by adding up output signals of two phase difference detecting pixel cells 51R among the phase difference detecting pixel cells 51R included in the divided group BG1A, the two phase difference detecting pixel cells 51R being connected by an arrow in FIG. 4 at the same position in the column direction Y, as an output signal group of the phase difference detecting pixel cells 51R in the divided group BG1A.

The defocus amount calculating unit 19 calculates a phase difference $\theta aA$ of the output signal group of the phase difference detecting pixel cells 51R with respect to the output signal group of the phase difference detecting pixel cells 51L which are included in the divided group BG1A by performing the correlation calculation on the two output signal groups.

Similarly in the divided group BG2A, the defocus amount calculating unit 19 adds up output signals of the phase difference detecting pixel cells 51L at the same position in the column direction Y, among the phase difference detecting pixel cells 51L included in the divided group BG2A and adds up output signals of the phase difference detecting pixel cells 51R in the same position in the column direction Y, among the phase difference detecting pixel cells 51R included in the divided group BG2A.

The defocus amount calculating unit 19 calculates a phase difference $\theta bA$ of the output signal group which is generated by adding up the output signals of the phase difference detecting pixel cells 51L with respect to the output signal group which is generated by adding up the output signals of the phase difference detecting pixel cells 51R by performing the correlation calculation on the two output signal groups.

The imaging element driving unit 10 initiates the exposure periods of the pixel cell rows for the divided group BG1A in the same order as the arrangement order of the pixel cell rows, that is, in an order of the pixel cell row L1→the pixel cell row L2→the pixel cell row L3→the pixel cell row L4.

In contrast, the imaging element driving unit 10 initiates the exposure periods of the pixel cell rows for the divided group BG2A in a different order from the arrangement order of the pixel cell rows, that is, in an order of the pixel cell row L2A→the pixel cell row L1A→the pixel cell row L4A→the pixel cell row L3A.

The defocus amount calculating unit 19 calculates a defocus amount in the unit group based on information obtained by performing the operation of $\theta aA - \theta bA$ or $\theta bA - \theta aA$.

As described above, the initiation order of the exposure periods of the pixel cell rows in the unit group is determined and the operation of $\theta aA - \theta bA$ or $\theta bA - \theta aA$ is performed, so that the error component caused by a difference of the exposure periods may be cancelled, thereby improving calculation precision of the defocus amount.

According to the first modified exemplary embodiment, even when the subject is dark, the correlation calculation is performed using a signal obtained by adding up the output signals of the two phase difference detecting pixel cells, so that the precision of the result of the correlation calculation may be improved by increasing sensitivity.

In FIG. 4, the signal obtained by adding up the output signals of the two phase difference detecting pixel cells connected by the arrow may be obtained by mixing accumulated charges of the two phase difference detecting pixel cells in the solid-state imaging element 5 or adding up the output signals of the two phase difference detecting pixel cells. Further, the output signals may be separately obtained from the two phase difference detecting pixel cells and the two output signals may be added up in the analog signal processing unit 6.

When the imaging element driving unit 10 initiates the exposure periods of the pixel cell rows for the divided group BG1A in an order of the pixel cell row L1→the pixel cell row L3→the pixel cell row L2→the pixel cell row L4 and initiates the exposure periods of the pixel cell rows for the divided group BG2A in an order of the pixel cell row L2A→the pixel cell row L4A→the pixel cell row L1A→the pixel cell row L3A, the same effect may be achieved.

In this case, even though a number of output signals to be added up is two, the number of output signals to be added up may be three or more. An example when the number of output signals to be added up is three will be described in the following second modified exemplary embodiment.

(Second Modified Exemplary Embodiment)

In a second modified exemplary embodiment, the defocus amount calculating unit 19 sets a group formed by six first pixel cell rows and six second pixel cell rows which are alternately arranged to each other in the column direction Y, as a unit group, and calculates a defocus amount for every unit group.

Figure 5:
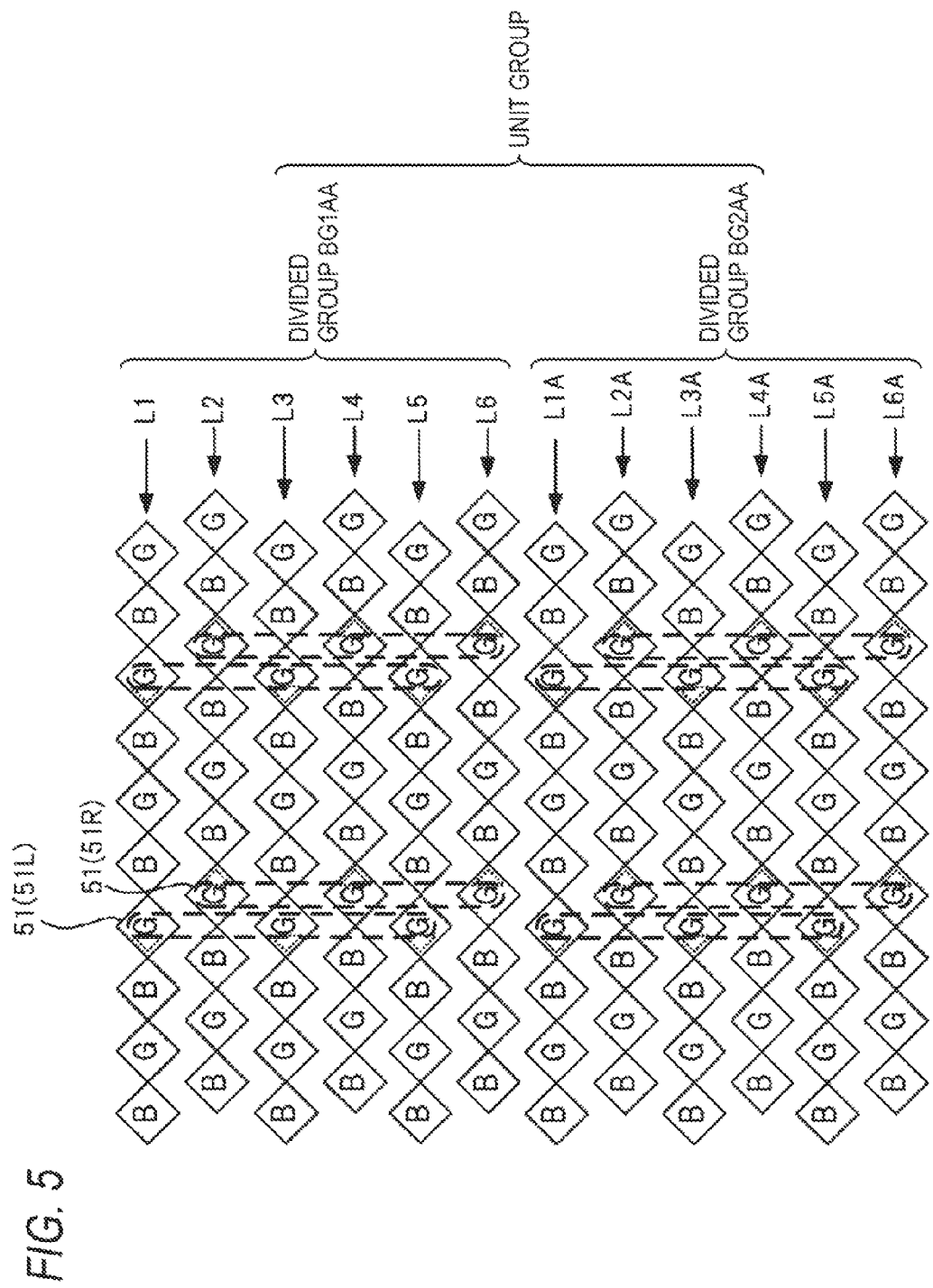
FIG. 5 is a view illustrating twelve pixel cell rows which include phase difference detecting pixel cells which belong to a unit group.

FIG. 5 is a view illustrating 12 pixel cell rows which include phase difference detecting pixel cells which belongs to a unit group. Hereinafter, a group formed by six pixel cell rows (pixel cell rows L1 to L6) which is the upper half in FIG. 5 is referred to as a divided group BG1AA and a group formed by the remaining six pixel rows (pixel cell rows L1A to L6A) is referred to as a divided group BG2AA.

The defocus amount calculating unit 19 adds up output signals of three phase difference detecting pixel cells 51L enclosed by a broken line in FIG. 5 which are in the same position in the column direction Y, among the phase difference detecting pixel cells 51L included in the divided group BG1AA.

The defocus amount calculating unit 19 adds up output signals of three phase difference detecting pixel cells 51R enclosed by a broken line in FIG. 5 which are in the same position in the column direction Y, among the phase difference detecting pixel cells 51R included in the divided group BG1AA.

The defocus amount calculating unit 19 calculates a phase difference θaAA of the output signal group which is generated by adding up the output signals of the phase difference detecting pixel cells 51R with respect to the output signal group which is generated by adding up the output signals of the phase difference detecting pixel cells 51L by performing correlation calculation on the two output signal groups.

Similarly in the divided group BG2AA, the defocus amount calculating unit 19 adds up the output signals of the phase difference detecting pixel cells 51L enclosed by the broken line in FIG. 5 and adds up the output signals of the phase difference detecting pixel cells 51R enclosed by the broken line in FIG. 5.

The defocus amount calculating unit 19 calculates a phase difference θbAA of the output signal group which is generated by adding up the output signals of the phase difference detecting pixel cells 51L with respect to the output signal group which is generated by adding up the output signals of the phase difference detecting pixel cells 51R by performing correlation calculation on the two output signal groups.

The imaging element driving unit 10 initiates the exposure periods of the pixel cell rows for the divided group BG1AA in the same order as the arrangement order of the pixel cell rows, that is, in an order of the pixel cell row L1→the pixel cell row L2→the pixel cell row L3→the pixel cell row L4→the pixel cell row L5→the pixel cell row L6. In contrast, the imaging element driving unit 10 initiates the exposure periods of the pixel cell rows for the divided group BG2AA in a different order from the arrangement order of the pixel cell rows, that is, in an order of the pixel cell row L2A→the pixel cell row L1A→the pixel cell row L4A→the pixel cell row L3A→the pixel cell row L6A→the pixel cell row L5A.

Alternatively, the imaging element driving unit 10 initiates the exposure periods of the pixel cell rows for the divided group BG1AA in an order of the pixel cell row L1→the pixel cell row L3→the pixel cell row L5→the pixel cell row L2→the pixel cell row L4→the pixel cell row L6, and initiates the exposure periods of the pixel cell rows for the divided group BG2AA in an order of the pixel cell row L2A→the pixel cell row L4A→the pixel cell row L6A→the pixel cell row L1A→the pixel cell row L3A→the pixel cell row L5A.

The defocus amount calculating unit 19 calculates a defocus amount in the unit group based on information obtained by performing the operation of θaAA−θbAA or θbAA−θaAA.

Also in this modified exemplary embodiment, the imaging element driving unit 10 may initiate the exposure periods of the pixel cell rows in the divided group BG1AA and the divided group BG2AA in different orders from each other, as described above, so that the error component caused by a difference of the exposure periods is not included in the result of the operation of θaAA−θbAA or θbAA−θaAA, thereby precisely calculating the defocus amount.

When the number of output signals to be added up is increased, whenever the number of output signals to be added up is increased by one, one first pixel cell row and one second pixel cell row may be added to each divided group.

As described above, the defocus amount calculating unit 19 calculates a defocus amount for every unit group which is formed by {2(n+1)} (n is a positive integer) first pixel cell rows and {2(n+1)} second pixel cell rows which are alternately arranged to each other in the column direction Y. The defocus amount calculating unit 19 divides the unit group into two divided groups, that is, a divided group which is formed by {2(n+1)} pixel cell rows which are continuously arranged in the column direction Y and a divided group which is formed by {2(n+1)} pixel cell rows which are continuously arranged in the column direction Y. Further, the defocus amount calculating unit 19 calculates a phase difference of the output signal group of the phase difference detecting pixel cells 51L with respect to the output signal group of the phase difference detecting pixel cells 51R for one divided group, and calculates a phase difference of the output signal group of the phase difference detecting pixel cells 51R with respect to the output signal group of the phase difference detecting pixel cells 51L for the other divided group to calculate a defocus amount based on a difference between the two calculated phase differences.

The imaging element driving unit 10 drives to initiate the exposure periods of two pixel cell rows (two pixel cell rows arranged in the same position in the divided groups) in the respective divided groups in different orders, the two pixel cell rows being disposed in the corresponding positions in the divided groups, so as to prevent the error component caused by a difference of the exposure periods of the pixel cell rows from being included in the difference between the two phase differences. Therefore, the defocus amount may be calculated without incurring an error caused by a difference of the exposure periods for the respective pixel cell rows.

When the output signals are not added up, that is, when n is zero, the number of pixel cell rows between the two pixel cell rows which belong to one divided group needs to be equal to the number of pixel cell rows between the two pixel cell rows which belong to the other divided group.

When n is equal to or larger than 1, and a first pixel cell row and a second pixel cell row which is adjacent to the first pixel cell row form a pair, in a plurality of pairs which belongs to one divided group, the numbers of the pixel cell rows between the first pixel cell row and the second pixel cell row in the respective pairs become equal to each other, so that the numbers of the pixel cell rows between the pairs need to be equal to each other.

When the above-mentioned condition is satisfied, in all the unit groups, the arrangement interval of the first pixel cell rows does not need to be the same as the arrangement interval of the second pixel cell rows.

Figure 6:
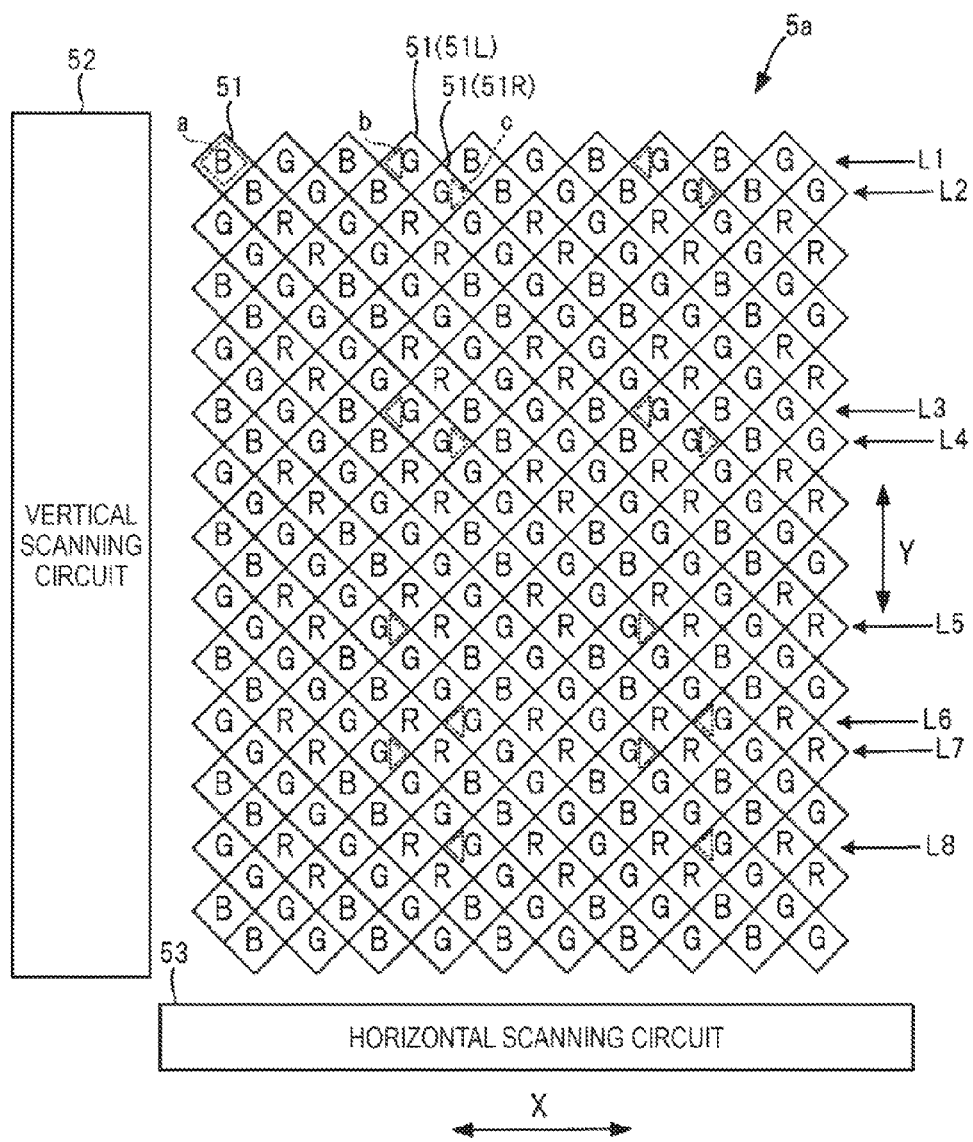
FIG. 6 is a view illustrating a solid-state imaging element 5a which is a modified exemplary embodiment of the solid-state imaging element 5 illustrated in FIG. 2.

FIG. 6 is a view illustrating a solid-state imaging element 5a which is a modified exemplary embodiment of the solid-state imaging element 5 illustrated in FIG. 2. A solid-state imaging element 5a has the same configuration as the solid-state imaging element 5 except that the arrangement of the phase difference detecting pixel cells 51R and the phase difference detecting pixel cell 51Ls is changed.

In FIG. 6, a pixel cell row L1 and a pixel cell row L2 are arranged without having a pixel cell row interposed therebetween and a pixel cell row L3 and a pixel cell row L4 are arranged without having a pixel cell row interposed therebetween. In contrast, a pixel cell row L5 and a pixel cell row L6 are arranged with two pixel cell rows interposed therebetween and a pixel cell row L7 and a pixel cell row L8 are arranged with two pixel cell rows interposed therebetween.

As described above, in the unit group formed by the pixel cell rows L1 to L4 and the unit group formed by the pixel cell rows L5 to L8, an arrangement interval (an arrangement density) of the pixel cell rows including the phase difference detecting pixel cells in the column direction Y is changed. By doing this, for example, a center portion in a region where the pixel cells 51 are arranged may have a high arrangement density and a peripheral portion thereof may have a low arrangement density so that an imaging element having a broad applicable range may be realized. Further, a configuration which includes three or more types of unit groups having different arrangement densities may be realized.

Until now, the pixel cells 51 are exemplified to be arranged in a so-called honey comb arrangement, but the present invention is applicable to a solid-state imaging element in which the pixel cells 51 are arranged in a square lattice pattern.

Figure 7:
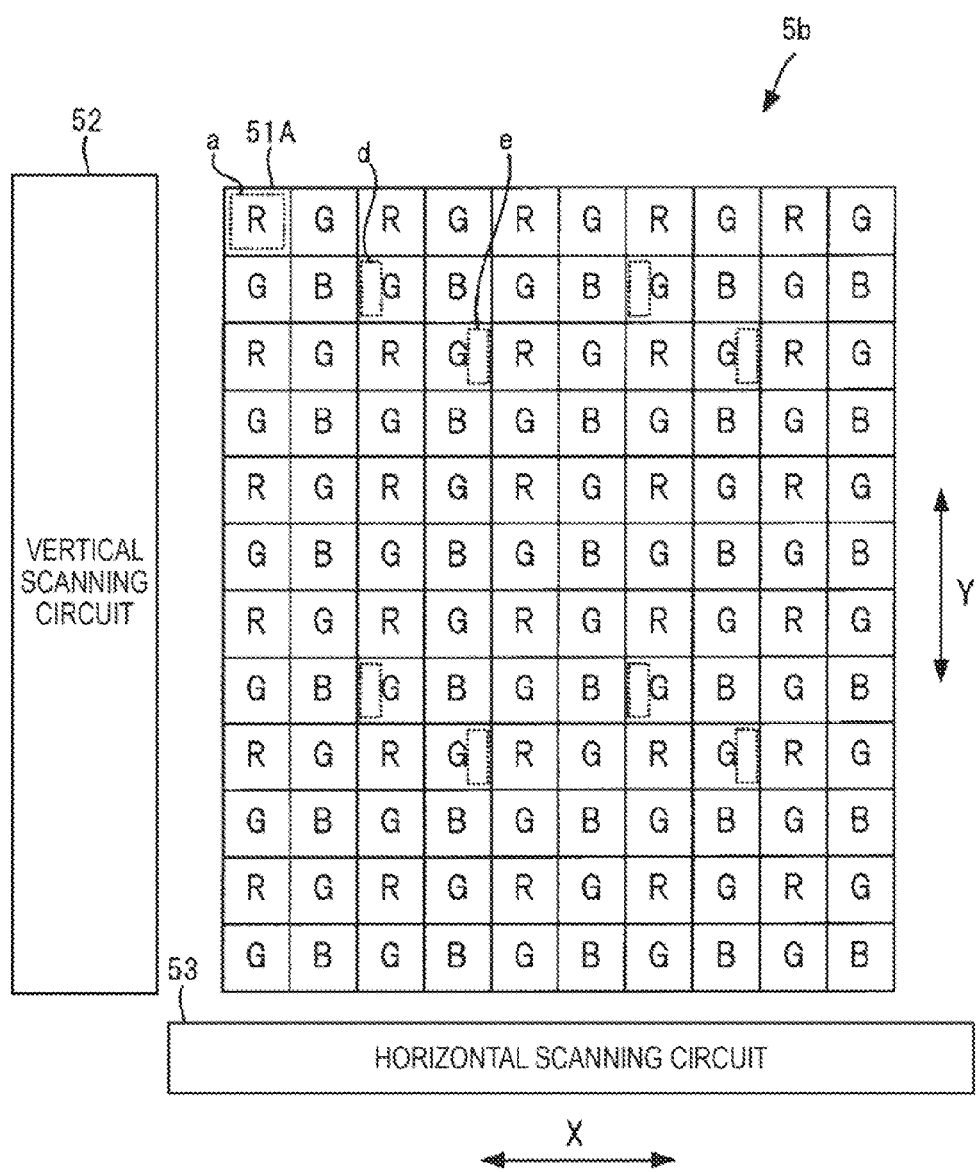
FIG. 7 is a view illustrating a solid-state imaging element 5b which is a modified exemplary embodiment of the solid-state imaging element 5 illustrated in FIG. 2.

FIG. 7 is a view illustrating a solid-state imaging element 5b which is a modified exemplary embodiment of the solid-state imaging element 5 illustrated in FIG. 2.

A solid-state imaging element 5b includes a plurality of pixel cells 51A, which is arranged in a square lattice pattern in a row direction X and a column direction Y, a vertical scanning circuit 52, and a horizontal scanning circuit 53. A configuration of the pixel cells 51A is the same as that of the pixel cells 51 and an arrangement of color filters is a Bayer arrangement.

The plurality of pixel cells 51A includes a general pixel cell 51A in which an opening "a" of a light shielding film is not off-centered and phase difference detecting pixel cells having off-centered openings "d" and "e". The pixel cell 51A having the opening "d" corresponds to the phase difference detecting pixel cell 51L and the pixel cell 51A having the opening "e" corresponds to the phase difference detecting pixel cell 51R.

Even in the solid-state imaging element 5b with this configuration, the above-described defocus amount calculating method and the driving method of the solid-state imaging element 5 may be combined to precisely calculate the defocus amount.

Until now, the solid-state imaging element in which a part of the plurality of pixel cells serves as phase difference detecting pixel cells is exemplified, but a solid-state imaging element in which all the plurality of pixel cells serves as the phase difference detecting pixel cells may be allowed. For example, in FIG. 2, the pixel cells in the odd-numbered pixel cell rows may serve as the phase difference detecting pixel cells 51L and the pixel cells in the even-numbered pixel cell rows may serve as the phase difference detecting pixel cells 51R.

In this case, captured image signals obtained from the even-numbered phase difference detecting pixel cells 51R and captured image signals obtained from the odd-numbered phase difference detecting pixel cells 51L may be combined to generate stereoscopic image data which may be stereoscopically viewed. Further, when the phase difference AF is performed, a plurality of unit groups is previously set and a defocus amount may be calculated for every unit group to perform focus control.

Next, descriptions will be made on a configuration of a smart phone as an imaging device.

Figure 8:
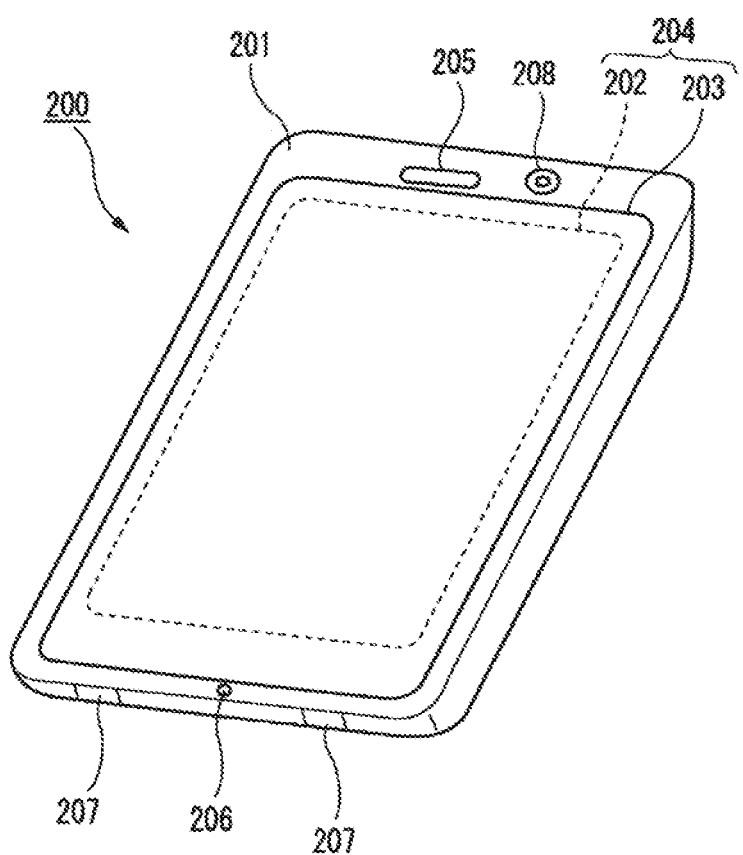
FIG. 8 is a diagram illustrating a configuration of a smart phone as an imaging device.

FIG. 8 illustrates an outer appearance of a smart phone 200 which is an exemplary embodiment of the imaging device of the present invention. The smart phone 200 illustrated in FIG. 8 includes a flat panel type case 201 and is provided, on one surface of the case 201, with a display input unit 204 in which a display panel 202 as a display unit, and an operating panel 203 as an input unit are integrated. In addition, such a case 201 includes a speaker 205, a microphone 206, an operating unit 207, and a camera 208. However, the configuration of the case 201 is not limited thereto. For example, a configuration in which the display unit and the input unit are independent from each other may be employed or a configuration having a folding structure or a slide mechanism may be employed.

Figure 9:
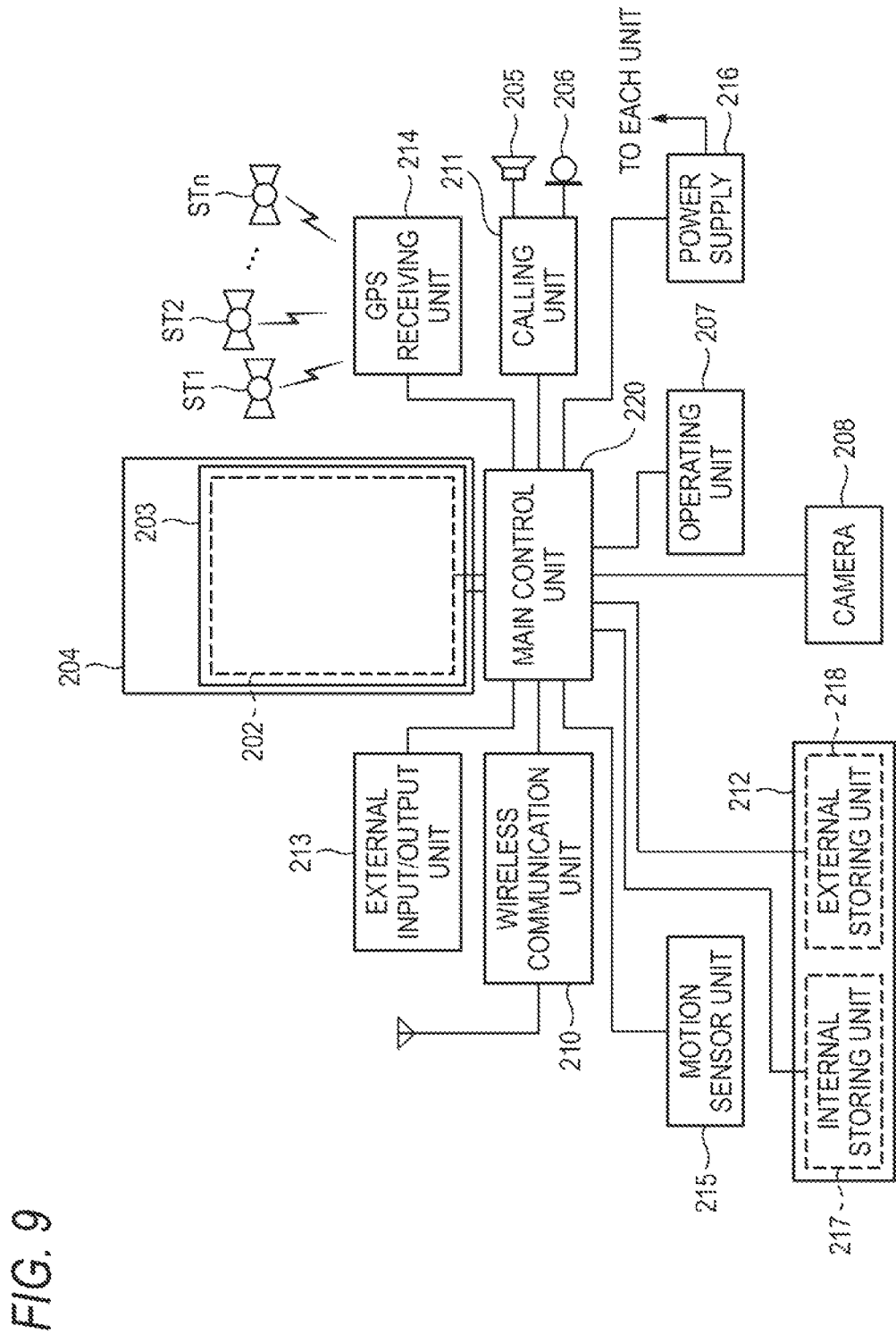
FIG. 9 is a block diagram illustrating an internal configuration of the smart phone illustrated in FIG. 8.

FIG. 9 is a block diagram illustrating a configuration of the smart phone 200 illustrated in FIG. 8. As illustrated in FIG. 9, as main components, the smart phone includes a wireless communication unit 210, a display input unit 204, a calling unit 211, an operating unit 207, a camera 208, a storing unit 212, an external input/output unit 213, a global positioning system (GPS) receiving unit 214, a motion sensor unit 215, a power supply 216, and a main control unit 220. Further, as a main function of the smart phone 200, the smart phone 200 is provided with a wireless communication function which performs mobile wireless communication through a base station device BS which is not illustrated and a mobile communication network NW which is not illustrated.

The wireless communication unit 210 performs wireless communication with the base station device BS which is accommodated in the mobile communication network NW in accordance with an instruction of the main control unit 220. The wireless communication unit 210 transmits/receives various file data such as voice data and image data and electronic mail data or receives web data or streaming data using the wireless communication.

The display input unit 204 is provided with a display panel 202 and an operating panel 203 as a so-called touch panel which displays an image (a still image or a moving picture) or text information so as to visually transmit information to a user, and detects the user's operation on displayed information, under the control of the main control unit 220.

The display panel 202 uses a liquid crystal display (LCD), an organic electro-luminescence display (OELD), or the like, as a display device.

The operating panel 203 is a device which is mounted so as to visibly recognize an image which is displayed on a display surface of the display panel 202 to detect one or a plurality of coordinates and is manipulated by a finger of the user or a stylus. When the device is operated by the finger of the user or the stylus, a detection signal which is generated based on the operation is output to the main control unit 220. Subsequently, the main control unit 220 detects an operating position (coordinate) on the display panel 202, based on the received detection signal.

As illustrated in FIG. 8, although the display panel 202 and the operating panel 203 of the smart phone 200 exemplified as an exemplary embodiment of the imaging device of the present invention are integrated with each other to constitute the display input unit 204, the operating panel 203 may be disposed to completely cover the display panel 202.

When such an arrangement is employed, the operating panel 203 may be provided with a function of detecting the user's operation on a region other than the display panel 202. In other words, the operating panel 203 may include a detection region (hereinafter, referred to as a "display region") on an overlapping portion which overlaps with the display panel 202 and a detection region (hereinafter, referred to as a "non-display region") for other outer peripheral portions which do not overlap with the display panel 202.

Although the size of the display region and the size of the display panel 202 may completely coincide with each other, both sizes do not necessarily coincide with each other. In addition, the operating panel 203 may include two sensitive regions of an outer peripheral portion and an inner portion other than the outer peripheral portion. Moreover, a width of the outer peripheral portion is appropriately designed in accordance with the size of the case 201. Moreover, a position detecting system employed in the operating panel 203, a matrix switch system, a resistive layer system, a surface elastic wave system, an infrared system, an electromagnetic induction system, or an electrostatic capacitive system may be exemplified, and any system may be employed.

The calling unit 211 includes the speaker 205 or the microphone 206 and converts the user's voice input through the microphone 206 into voice data to be processed by the main control unit 220 and outputs the converted voice data to the main control unit 220, or decodes voice data received by the wireless communication unit 210 or the external input/output unit 213 and outputs the decoded voice data from the speaker 205. Furthermore, as illustrated in FIG. 8, for example, the speaker 205 may be mounted on the same surface as the surface provided with the display input unit 204 and the microphone 206 may be mounted on a side surface of the case 201.

The operating unit 207 is a hardware key which uses a key switch and receives an instruction from the user. For example, as illustrated in FIG. 8, the operating unit 207 is a push button type switch which is mounted on a side surface of the case 201 of the smart phone 200 and turned on when the operating unit 207 is pressed by a finger and turned off by restoring force of a spring when the finger is removed.

The storing unit 212 stores a control program or control data of the main control unit 220, application software, address data to which names, phone numbers, or the like of communication counterparts are correlated, transmitted/received electronic mail data, web data downloaded by web browsing or downloaded content data, and temporarily stores streaming data. Further, the storing unit 212 is configured by an internal storing unit 217 which is mounted in the smart phone and an external storing unit 218 which includes a detachable external memory slot. Furthermore, the internal storing unit 217 and the external storing unit 218 which configure the storing unit 212 are implemented by using a storing medium such as a flash memory type, hard disk type, multimedia card micro type, card type memory (for example, MicroSD (registered trademark) memory), a random access memory (RAM), or a read only memory (ROM).

The external input/output unit 213 functions as an interface with all external devices which are connected to the smart phone 200 and is configured to be directly or indirectly connected to any other external device by communication (for example, universal serial bus (USB) or IEEE1394) or a network (for example, Internet, wireless LAN, Bluetooth (registered trademark), a radio frequency identification (RFID), an infrared data association (IrDA (registered trademark)), ultra wideband (UWB: registered trademark), or a ZigBee (registered trademark).

As external devices connected to the smart phone 200, a wired/wireless head set, a wired/wireless external charger, a wired/wireless data port, a memory card or a SIM (subscriber identity module) card/UIM (user identity module) card connected through a card socket, an external audio/video device connected through an audio/video input/output (I/O) terminal, a wirelessly connected external audio/video device, a wiredly/wirelessly connected smart phone, a wiredly/wirelessly connected personal computer, a wiredly/wirelessly connected PDA, a wiredly/wirelessly connected personal computer, or an earphone may be exemplified. The external input/output unit 213 may transmit data which is received from such external devices to individual components in the smart phone 200 and may also allow the data in the smart phone 200 to be transmitted to an external device.

The GPS receiving unit 214 receives GPS signals which are transmitted from GPS satellites ST1 to STn according to an instruction from the main control unit 220 and performs a position measurement operation processing based on the received GPS signals to detect positions including a latitude, a longitude, and a height of the smart phone 200. When the GPS receiving unit 214 may obtain positional information from the wireless communication unit 210 or the external input/output unit 213 (for example, the wireless LAN), the GPS receiving unit 214 may detect a position using that positional information.

The motion sensor unit 215 includes, for example, a three axis acceleration sensor and detects physical movement of the smart phone 200 according to the instruction of the main control unit 220. When the physical movement of the smart phone 200 is detected, the movement direction or acceleration of the smart phone 200 is detected. The detected result is output to the main control unit 220.

The power supply 216 supplies power which is accumulated in a battery (not illustrated) to individual units of the smart phone 200 according to the instruction of the main control unit 220.

The main control unit 220 includes a microprocessor and operates according to a control program or control data stored in the storing unit 212 and collectively controls individual units of the smart phone 200. Further, the main control unit 220 is provided with a mobile communication control function and an application processing function to control individual units of a communication system in order to perform voice communication or data communication through the wireless communication unit 210.

The application processing function is implemented when the main control unit 220 is operated according to the application software which is stored in the storing unit 212. The application processing function includes, for example, an infrared communication function which performs data communication with a counterpart device by controlling the external input/output unit 213, an electronic mail function which transmits/receives an electronic mail, or a web browsing function which browses a web page.

The main control unit 220 is provided with an image processing function which displays an image on the display input unit 204 based on the image data (still image or moving picture data) such as received data or downloaded streaming data. The image processing function refers to a function of decoding the image data and performing image processings on the decoded result to display the image on the display input unit 204 by the main control unit 220.

The main control unit 220 executes a display control of the display panel 202 and an operation detection control which detects a user's operation through the operating unit 207 and the operating panel 203. By executing the display control, the main control unit 220 displays an icon to activate application software or a software key such as a scroll bar or displays a window for preparing electronic mail. Here, the scroll bar refers to a software key for receiving an instruction to move a displayed portion of an image with respect to a large image which is not covered by the display region of the display panel 202.

When the operation detection control is executed, the main control unit 220 detects the user's operation through the operating unit 207 or receives an operation on the icon or the input of a character string of an input section of the window through the operating panel 203 or receives a scroll request of a displayed image through the scroll bar.

By executing the operation detection control, the main control unit 220 determines whether the operating position of the operating panel 203 is an overlapping portion (display region) which overlaps the display panel 202 or an outer peripheral portion (non-display region) which does not overlap the display panel 202 other than the overlapping portion, and is provided with a touch panel control function that controls a sensitive region of the operating panel 203 or a display position of the software key.

The main control unit 220 may detect a gesture operation with respect to the operating panel 203 and execute a predetermined function according to the detected gesture operation. The gesture operation refers to an operation which draws a trace using a finger, designates a plurality of positions simultaneously, or a combination thereof to draw a trace for at least one from the plurality of positions, rather than a simple touch operation of the related art.

The camera 208 includes a configuration other than the external memory control unit 20, the recording medium 21, the display control unit 22, the display unit 23, and the operating unit 14 in the digital camera which is illustrated in FIG. 1. Captured image data which is generated by the camera 208 may be stored in the storing unit 212 or output through the external input/output unit 213 or the wireless communication unit 210. As illustrated in FIG. 8, although the camera 208 is mounted on the same surface as the display input unit 204 in the smart phone 200, the mounting position of the camera 208 is not limited thereto and the camera 208 may be mounted on a rear surface of the display input unit 204.

The camera 208 may be used for various functions of the smart phone 200. For example, an image which is obtained by the camera 208 may be displayed on the display panel 202 or the image of the camera 208 may be used as one of the operation inputs of the operating panel 203. Further, when the GPS receiving unit 214 detects the position, the position may be detected with reference to the image from the camera 208. Moreover, an optical axis direction of the camera 208 of the smart phone 200 may be determined or a current usage environment may also be determined with reference to the image from the camera 208, either without using the 3-axis acceleration sensor or using the 3-axis acceleration sensor. Of course, the image from the camera 208 can be used in the application software.

Positional information obtained by the GPS receiving unit 214, voice information obtained by the microphone 206 (which may be text information obtained by performing a voice-text conversion by the main control unit or the like), or posture information obtained by the motion sensor unit 215 may be added to the image data of a still image or a moving picture to be stored in the storing unit 212 or output through the external input/output unit 213 or the wireless communication unit 210.

Even in the smart phone 200 having the above-described configuration, phase difference AF may be performed with high precision.

As described above, the specification discloses the following matters.

It is disclosed an imaging device, including: an imaging element which includes a plurality of first pixel cell rows which includes a plurality of first pixel cells which receives one of a pair of luminous fluxes passing through different regions of a pupil area of a photographing optical system to output signals in accordance with an amount of received light and is arranged with a predetermined interval in a row direction and a plurality of second pixel cell rows which includes a plurality of second pixel cells which receives the other one of the pair of luminous fluxes to output signals in accordance with an amount of received light and is arranged with the predetermined interval in the row direction, the first pixel cell rows and the second pixel cell rows being alternately arranged in a column direction which is perpendicular to the row direction, a driving unit which drives to shift exposure periods of the pixel cell rows, respectively and read out signals output from the first pixel cells or the second pixel cells which are included in each pixel cell row in accordance with the amount of received light during the exposure periods; a defocus amount calculating unit which calculates a defocus amount using the output signals of the first pixel cells and the output signals of the second pixel cells; and a focus control unit which controls a focus state of the photographing optical system based on the defocus amount calculated by the defocus amount calculating unit, in which the pixel cell rows which are arranged in the column direction are divided into groups having the same number of first pixel cell rows and second pixel cell rows as groups each of which includes n (n is an even number) pixel cell rows which are continuously arranged in the column direction, and the driving unit drives to initiate the exposure of two adjacent pixel cell rows in one of two groups which are continuously arranged in the column direction in a reverse order to an order of initiation of the exposure of two pixel cell rows which are disposed at corresponding positions in the other one of the two groups.

It is the imaging device, in which the defocus amount calculating unit calculates a phase difference of an output signal group of the second pixel cells which are included in the second pixel cell row with respect to an output signal group of the first pixel cells included in the first pixel cell row for one of the two groups, calculates a phase difference of an output signal group of the first pixel cells which are included in the first pixel cell row with respect to an output signal group of the second pixel cells included in the second pixel cell row for the other one of the two groups, and calculates the defocus amount based on a difference between the two calculated phase differences.

It is the imaging device, in which when n is 2, the driving unit controls an initiation order of exposure periods of two pixel cell rows in one of the groups to be equal to an arrangement order of the two pixel cell rows in the column direction and controls an initiation order of exposure periods of two pixel cell rows in the other group to be reverse to the arrangement order of the two pixel cell rows in the column direction.

It is the imaging device, in which when n is equal to or larger than 4, the defocus amount calculating unit calculates the phase difference for each of the two groups using an output signal group obtained by adding up output signals of the first pixel cells which are in the same position in the column direction of the group and an output signal group obtained by adding up output signals of the second pixel cells which are in the same position in the column direction of the group.

It is the imaging device, in which a pair is formed by the first pixel cell row and the second pixel cell row which is adjacent to the first pixel cell row, the imaging element has a plurality of unit groups which is formed by the two groups, and the plurality of unit groups includes plural types of unit groups having different distances between two pixel cell rows which form the pair.

It is an imaging method, which is performed on an imaging element which includes a plurality of first pixel cell rows which includes a plurality of first pixel cells which receives one of a pair of luminous fluxes passing through different regions of a pupil area of a photographing optical system to output signals in accordance with an amount of received light and is arranged with a predetermined interval in a row direction and a plurality of second pixel cell rows which includes a plurality of second pixel cells which receives the other one of the pair of luminous fluxes to output signals in accordance with an amount of received light and is arranged with the predetermined interval in the row direction, the first pixel cell rows and the second pixel cell rows being alternately arranged in a column direction which is perpendicular to the row direction, the method including: a driving step of driving to shift exposure periods of the pixel cell rows, respectively and read out signals output from the first pixel cells or the second pixel cells which are included in each pixel cell row in accordance with the amount of received light during the exposure periods; a defocus amount calculating step of calculating a defocus amount using the output signals of the first pixel cells and the output signals of the second pixel cells; and a focus control step of controlling a focus state of the photographing optical system based on the calculated defocus amount, in which the pixel cell rows which are arranged in the column direction are divided into groups having the same number of first pixel cell rows and second pixel cell rows as groups each of which includes even numbers of pixel cell rows which are continuously arranged in the column direction, and the driving step drives to initiate the exposure of two adjacent pixel cell rows in one of two groups which are continuously arranged in the column direction in a reverse order to an order of initiation of the exposure of two pixel cell rows which are disposed at corresponding positions in the other one of the two groups.

It is the imaging method, in which the defocus amount calculating step calculates a phase difference of an output signal group of the second pixel cells which are included in the second pixel cell row is calculated with respect to an output signal group of the first pixel cells included in the first pixel cell row for one of the two groups which are continuously arranged in the column direction, calculates a phase difference of an output signal group of the first pixel cells which are included in the first pixel cell row is calculated with respect to an output signal group of the second pixel cells included in the second pixel cell row for the other one of the two groups, and calculates the defocus amount based on a difference between the two calculated phase differences.

According to the present invention, it is possible to provide an imaging device and an imaging method which may calculate a defocus amount having no error caused by rolling shutter driving without significantly affecting a photographed image.

Although the present invention has been described above by the specific exemplary embodiments, the present invention is not limited to the exemplary embodiments but various modifications may be allowed without departing from a technical spirit of the disclosed invention.

The present application is based on the Japanese Patent Application (Japanese Patent Application No. 2012-129815) filed on Jun. 7, 2012, and the content thereof is hereby incorporated by reference in its entirety.

What is claimed is:

1. An imaging device, comprising:
an imaging element which includes
a plurality of first pixel cell rows which includes a plurality of first pixel cells which receives one of a pair of luminous fluxes passing through different regions of a pupil area of a photographing optical system to output signals in accordance with an amount of received light and is arranged with a predetermined interval in a row direction and
a plurality of second pixel cell rows which includes a plurality of second pixel cells which receives the other one of the pair of luminous fluxes to output signals in accordance with an amount of received light and is arranged with the predetermined interval in the row direction, the first pixel cell rows and the second pixel cell rows being alternately arranged in a column direction which is perpendicular to the row direction,
a driving unit which drives to shift exposure periods of the pixel cell rows, respectively and read out signals output from the first pixel cells or the second pixel cells which are included in each pixel cell row in accordance with the amount of received light during the exposure periods;
a defocus amount calculating unit which calculates a defocus amount using the output signals of the first pixel cells and the output signals of the second pixel cells; and
a focus control unit which controls a focus state of the photographing optical system based on the defocus amount calculated by the defocus amount calculating unit,
wherein the pixel cell rows which are arranged in the column direction are divided into groups having the same number of first pixel cell rows and second pixel cell rows as groups each of which includes n pixel cell rows which are continuously arranged in the column direction, wherein n is an even number, and
the driving unit drives to initiate the exposure of two adjacent pixel cell rows in one of two groups which are continuously arranged in the column direction in a reverse order to an order of initiation of the exposure of two pixel cell rows which are disposed at corresponding positions in the other one of the two groups.

2. The imaging device of claim 1, wherein the defocus amount calculating unit calculates a phase difference of an output signal group of the second pixel cells which are included in the second pixel cell row with respect to an output signal group of the first pixel cells included in the first pixel cell row for one of the two groups, calculates a phase difference of an output signal group of the first pixel cells which are included in the first pixel cell row with respect to an output signal group of the second pixel cells included in the second pixel cell row for the other one of the two groups, and calculates the defocus amount based on a difference between the two calculated phase differences.

3. The imaging device of claim 1, wherein when n is 2, the driving unit controls an initiation order of exposure periods of two pixel cell rows in one of the groups to be equal to an arrangement order of the two pixel cell rows in the column direction and controls an initiation order of exposure periods of two pixel cell rows in the other group to be reverse to the arrangement order of the two pixel cell rows in the column direction.

4. The imaging device of claim 2, wherein when n is equal to or larger than 4, the defocus amount calculating unit calculates the phase difference for each of the two groups using an output signal group obtained by adding up output signals of the first pixel cells which are in the same position in the column direction of the group and an output signal group obtained by adding up output signals of the second pixel cells which are in the same position in the column direction of the group.

5. The imaging device of claim 1, wherein a pair is formed by the first pixel cell row and the second pixel cell row which is adjacent to the first pixel cell row, the imaging element has a plurality of unit groups which is formed by the two groups, and the plurality of unit groups includes plural types of unit groups having different distances between two pixel cell rows which form the pair.

6. An imaging method, which is performed on an imaging element which includes a plurality of first pixel cell rows which includes a plurality of first pixel cells which receives one of a pair of luminous fluxes passing through different regions of a pupil area of a photographing optical system to output signals in accordance with an amount of received light and is arranged with a predetermined interval in a row direction and a plurality of second pixel cell rows which includes a plurality of second pixel cells which receives the other one of the pair of luminous fluxes to output signals in accordance with an amount of received light and is arranged with the predetermined interval in the row direction, the first pixel cell rows and the second pixel cell rows being alternately arranged in a column direction which is perpendicular to the row direction, the method comprising:

a driving step of driving to shift exposure periods of the pixel cell rows, respectively and read out signals output from the first pixel cells or the second pixel cells which are included in each pixel cell row in accordance with the amount of received light during the exposure periods;

a defocus amount calculating step of calculating a defocus amount using the output signals of the first pixel cells and the output signals of the second pixel cells; and a focus control step of controlling a focus state of the photographing optical system based on the calculated defocus amount, wherein the pixel cell rows which are arranged in the column direction are divided into groups having the same number of first pixel cell rows and second pixel cell rows as groups each of which includes even numbers of pixel cell rows which are continuously arranged in the column direction, and the driving step drives to initiate the exposure of two adjacent pixel cell rows in one of two groups which are continuously arranged in the column direction in a reverse order to an order of initiation of the exposure of two pixel cell rows which are disposed at corresponding positions in the other one of the two groups.

7. The imaging method of claim 6, wherein the defocus amount calculating step calculates a phase difference of an output signal group of the second pixel cells which are included in the second pixel cell row is calculated with respect to an output signal group of the first pixel cells included in the first pixel cell row for one of the two groups which are continuously arranged in the column direction, calculates a phase difference of an output signal group of the first pixel cells which are included in the first pixel cell row is calculated with respect to an output signal group of the second pixel cells included in the second pixel cell row for the other one of the two groups, and calculates the defocus amount based on a difference between the two calculated phase differences.

* * * * *